(12) United States Patent
Kanai et al.

(10) Patent No.: US 9,848,617 B1
(45) Date of Patent: Dec. 26, 2017

(54) COAGULANT COMPOSITION FOR TOFU AND METHOD OF PRODUCING TOFU USING THE SAME

(71) Applicant: TAIKI PRODUCT, INC., Adachi-ku (JP)

(72) Inventors: Kenzou Kanai, Saitama (JP); Yukitaka Tanaka, Kanagawa (JP)

(73) Assignee: TAIKI PRODUCT, INC., Adachi-ku (JP)

( * ) Notice: Subject to any disclaimer, the term of this patent is extended or adjusted under 35 U.S.C. 154(b) by 0 days.

(21) Appl. No.: 15/290,295

(22) Filed: Oct. 11, 2016

(51) Int. Cl.
*A23C 20/02* (2006.01)

(52) U.S. Cl.
CPC .................................. *A23C 20/025* (2013.01)

(58) Field of Classification Search
None
See application file for complete search history.

(56) References Cited

U.S. PATENT DOCUMENTS

2012/0156288 A1* 6/2012 Lakkis .................... A23P 10/30
424/455

FOREIGN PATENT DOCUMENTS

| JP | 53-69846 | 6/1978 |
|----|----------|--------|
| JP | 53-69847 | 6/1978 |
| JP | 53-96344 | 8/1978 |
| JP | 53-133653 | 11/1978 |
| JP | 61-227756 A | 10/1986 |
| JP | 62-5581 B2 | 2/1987 |
| JP | 62-163667 A | 7/1987 |
| JP | 7-274886 A | 10/1995 |
| JP | 2912249 | 6/1999 |
| JP | 2000-50827 A | 2/2000 |
| JP | 2000-270800 A | 10/2000 |
| JP | 3516298 | 4/2004 |
| JP | 2005-130803 A | 5/2005 |
| JP | 2006-6183 A | 1/2006 |
| JP | 2006-94831 | 4/2006 |
| JP | 4105674 | 6/2008 |
| JP | 2010-263796 A | 11/2010 |
| JP | 2014-45699 A | 3/2014 |
| JP | 2015-192613 | 11/2015 |
| KR | 10-2013-0091713 A | 8/2013 |

OTHER PUBLICATIONS

Li et al., "A Novel Approach to Improving the Quality of Bittern-Solidified Tofu by W/O Controlled-Release Coagulant. 2: Using the Improved Coagulant in Tofu Processing and Product Evaluation"—Food Bioprocess Technol. , 6, 2013, pp. 1801-1808.*
Milanovic et al., "Microencapsulation of Flavors in Carnauba Wax"—Sensors, 10, 2010, pp. 901-912.*
Mellema et al., "Wax encapsulation of water-soluble compounds for application in foods"—Journal of Microencapsualtion, Nov. 2006, 23(7), pp. 729-740.*
Japanese Office Action dated Mar. 8. 2016 in Patent Application No. 2014-071963 (without English Translation).
Japanese Office Action dated Jul. 12. 2016 in Patent Application No. 2014-071963 (without English Translation).
Oleochemistry Data Book, Maruzen Co., Ltd., 2012, pp. 26-28 and Cover pages (with English Translation).
Maruzen Food Dictionary, Maruzen Co., Ltd., 1998, pp. 753-754 and Cover pages (with English Translation).

* cited by examiner

*Primary Examiner* — Elizabeth Gwartney
(74) *Attorney, Agent, or Firm* — Oblon, McClelland, Maier & Neustadt, L.L.P.

(57) ABSTRACT

Provided is a coagulant composition for tofu having a sufficient slow-acting property in coagulation of soymilk in a tofu production process as a necessary condition, and being capable of developing the original flavor of tofu originated in a raw material soybean and its pressed soymilk as a sufficient condition, the coagulant composition being obtained by dispersing an inorganic salt-based coagulant for tofu in a mixture of a natural wax and an edible oil or fat.

17 Claims, No Drawings

COAGULANT COMPOSITION FOR TOFU AND METHOD OF PRODUCING TOFU USING THE SAME

BACKGROUND OF THE INVENTION

Field of the Invention

The present invention relates to a coagulant composition for tofu for coagulating soymilk and a method of producing a tofu using the same.

Description of the Related Art

As a tofu coagulant for coagulating soymilk, an inorganic salt such as magnesium chloride, magnesium sulfate, calcium chloride, and calcium sulfate, or an organic acid such as glucono delta-lactone has been heretofore used.

However, when such an inorganic salt is used as a tofu coagulant, the coagulation rate of soymilk is so high that production of a tofu whose inner phase has fine and uniform texture and which has high water retentivity and excellent mouthfeel and flavor, in particular, production of a "silken tofu", which is not subjected to a secondary molding, has been difficult. On the other hand, glucono delta-lactone shows improved coagulability but causes sour taste remained in the resulting tofu, and thus has had a problem in terms of flavor.

In order to solving the problems, various types of slow-acting coagulant for tofu in which the coagulation rate is controlled in an inorganic salt-based coagulant for tofu which otherwise shows a high coagulation rate of soymilk have recently been proposed. Examples of such a tofu coagulant include a coagulant composition for tofu containing an inorganic salt-based coagulant for tofu, a polyglycerol fatty acid ester, and an oil or fat (JP-B-2912249); a coagulant composition for tofu obtained by dispersing an inorganic salt-based coagulant for tofu in a polyhydric alcohol fatty acid ester, followed by pulverizing in a wet grinding mill (JP-B-3516298); a coagulant composition for tofu containing an inorganic salt-based coagulant for tofu, polyglycerol condensed ricinoleic acid ester, a polyol fatty acid ester, and a mixture of a dextrin and glycerol (JP-B-4105674); and a coagulant composition for tofu obtained by coating an inorganic salt-based coagulant for tofu with a starch and/or a saccharide and dispersing the coated coagulant in a polyhydric alcohol fatty acid ester (JP-A-2006-94831).

These tofu coagulants have become widely used as a tofu coagulant which shows sufficient slow-acting property in coagulation at an elevated temperature in a tofu production process, particularly in a mass production process. However, since the coagulants contains a large amount of a polyglycerol fatty acid ester, a polyhydric alcohol fatty acid ester, a dextrin, or the like, in particular, contains a large amount of a polyglycerol condensed ricinoleic acid ester which is a powerful W/O emulsifier, the resulting tofus are products having a stereotypical flavor in which the original flavor of tofu is lost, leading to deterioration of the value of the tofu.

SUMMARY OF THE INVENTION

An object of the present invention is to provide a coagulant composition for tofu having a sufficient slow-acting property in coagulation of soymilk in a tofu production process as a necessary condition, and being capable of developing the original flavor of tofu originated in a raw material soybean and its pressed soymilk as a sufficient condition.

As a result of intensive and extensive studies for solving the above problems, the present inventors have found that a coagulant composition for tofu comprising specific components has sufficient slow-acting property in coagulation of soymilk in a tofu production process and is capable of imparting the original flavor of tofu, thus completing the invention.

Specifically, the invention is directed to a coagulant composition for tofu which is obtained by dispersing an inorganic salt-based coagulant for tofu in a mixture of a natural wax and an edible oil or fat.

In addition, the invention is directed to a method of producing tofu in which the coagulant composition for tofu described above is used as a coagulant of soymilk.

Furthermore, the invention is directed to a tofu containing an inorganic salt-based coagulant for tofu, a natural wax, and an edible oil or fat.

The coagulant composition for tofu of the invention has sufficient slow-acting property in coagulation of soymilk in a tofu production process.

Furthermore, when a tofu is produced by using the coagulant composition for tofu of the invention, the problems arising in cases of producing tofu using a conventional water-in-oil type inorganic salt-based coagulant which uses a large amount of an emulsifier (so called, emulsified bittern) are resolved and the original flavor of tofu can be imparted.

DETAILED DESCRIPTION OF THE INVENTION

The inorganic salt-based coagulant for tofu for use in the coagulant composition for tofu of the present invention (hereinunder, referred to as "the present composition") is not particularly limited as long as it can coagulate soymilk to make tofu, and examples thereof include those containing an inorganic salt such as magnesium chloride, magnesium sulfate, and calcium chloride. The inorganic salt may be an anhydrate or may be a hydrate containing crystallization water. The inorganic salts may be used alone or in mixture of two or more thereof. As the inorganic salt-based coagulant for tofu, a commercially available crude seawater magnesium chloride (bittern) having adjusted compositions and concentrations of the above-mentioned inorganic salts and the like may be used. The concentration of the inorganic salt may be 20 to 70% by mass, preferably 30 to 70% by mass in terms of the hydrated form.

The edible oil or fat for use in the present composition is not particularly limited as long as it is an edible triglyceride, and examples thereof include vegetable oils or fats such as soybean oil, rape seed oil, cotton seed oil, safflower oil, sunflower oil, rice bran oil, cone oil, coconut oil, palm oil, and olive oil; animal oils or fats such as beef tallow and lard; those obtained by fractionating, hydrogenating, or transesterificating the vegetable or animal oils or fats; and medium chain fatty acid triglycerides. Among these edible oils or fats, those that are in a liquid form at normal temperature are preferred. The edible oils or fats may be used alone or in mixture of two or more thereof. The edible oil or fat may be contained in the present composition in an amount of 10 to 60% by mass, preferably 20 to 50% by mass.

The natural wax for use in the present composition is not particularly limited and includes those having a melting point of preferably 60° C. or higher and more preferably 60 to 85° C. that are approved for food. Examples of the natural wax include vegetable waxes such as Japan wax, candelilla wax, carnauba wax, and rice bran wax; and animal waxes such as lanolin and bees wax. Among these natural waxes, carnauba wax (melting point: 83° C.), rice bran wax (melting point: 73° C.), and bees wax (melting point: 64° C.) are preferred because of excellent dispersibility of the inorganic salt-based coagulant for tofu and good flavor. The natural waxes may be used alone or in mixture of two or more thereof. The natural waxes may be blended in an amount of 0.5 to 10 parts by mass, preferably 0.5 to 5 parts by mass relative to 100 parts by mass of the edible oil or fat.

In the present composition, a sufficient effect can be obtained even when no so-called emulsifier is used as a dispersion stabilizer, but for enhancing the dispersion stability, a dispersion stabilizer such as, for example, polyglycerol fatty acid ester, glycerol fatty acid ester, sorbitan fatty acid ester, and propylene glycol fatty acid ester may be blended to the extent that it does not impair the object of the invention. The dispersion stabilizer may be contained in the present composition in an amount of 0.1 to 6.0% by mass, preferably 0.2 to 2.0% by mass.

In the present composition, in addition to the essential components described above, a saccharide, a starch, a modified starch, a thickening and stabilizing agent, and the like may be blended to the extent that it does not impair the object of the invention. Examples of the saccharide include a monosaccharide, an oligosaccharide, a maltooligosaccharide, a dextrin, a degradation product of a starch, and a sugar alcohol. Examples of the starch include cone starch, potato starch, and tapioca starch. Examples of the modified starch include products obtained by subjecting the aforementioned starch to esterification, etherification, crosslinking, and a heat-moisture treatment. Examples of the thickening and stabilizing agent include alginic acid and/or salts thereof, carrageenan, xanthan gum, and guar gum.

The present composition can be obtained by dispersing an inorganic salt-based coagulant for tofu in a mixture of a natural wax and an edible oil or fat. Incidentally, in the mixture, the natural wax may be dissolved in the edible oil or fat, or a part thereof may be precipitated. The inorganic salt-based coagulant for tofu to be dispersed in the mixture of the natural wax and the edible oil or fat may be in a state of crystal powder or a state of solution in water and the like, but it is preferred that the coagulant is dispersed in a solution state. The amount of water in the case where the inorganic salt-based coagulant for tofu is dispersed in a solution state is not particularly limited, but, for example, the amount is 20 to 220 parts by mass, preferably 30 to 160 parts by mass relative to the 100 parts by mass of the entire mixture (oil phase) of the natural wax and the edible oil or fat. In cases where the inorganic salt-based coagulant for tofu is dispersed in a crystal powder state, the coagulant powder may be wetted, for example, with glycerol.

A preferred embodiment for obtaining the present composition is as follows. First, a mixture of an edible oil or fat and a natural wax is heated to the temperature at which the natural wax can dissolve or higher, to allow the natural wax to dissolve in the edible oil or fat. Next, an aqueous solution of an inorganic salt-based coagulant for tofu is separately prepared. In the mixture of the edible oil or fat and the natural wax in which the natural wax is in a dissolved state, the prepared aqueous solution of the inorganic salt-based coagulant for tofu is added portionwise under stirring with a stirrer, whereby the inorganic salt-based coagulant for tofu is uniformly dispersed. The stirrer used for stirring is not particularly limited, but examples thereof include T.K mixer (manufactured by Primix Corporation), Milder, and a high speed rotating homogenizer.

Another preferred embodiment for obtaining the present composition is as follows. First, a mixture of an edible oil or fat and a natural wax is heated to the temperature at which the natural wax can dissolve or higher, to allow the natural wax to dissolve in the edible oil or fat, and the resulting mixture is cooled to a room temperature or lower to precipitate (crystallize) a part of the natural wax. An aqueous solution of an inorganic salt-based coagulant for tofu is added portionwise to the mixture of the edible oil or fat and the natural wax in which the natural wax is partially in a state of precipitation, under stirring with a stirrer, whereby the inorganic salt-based coagulant for tofu is uniformly dispersed.

Yet another preferred embodiment for obtaining the present composition is as follows. First, a mixture of an edible oil or fat and a natural wax is heated to the temperature at which the natural wax can dissolve or higher, to allow the natural wax to dissolve in the edible oil or fat. Next, glycerol is added to an inorganic salt-based coagulant for tofu in a crystal powder state to wet the inorganic salt-based coagulant. The wetted inorganic salt-based coagulant for tofu is added portionwise to the mixture of the edible oil or fat and the natural wax in which the natural wax is in a dissolved state, under stirring with a stirrer to disperse the inorganic salt-based coagulant therein. Further, particles of the inorganic salt-based coagulant for tofu in the resulting dispersion is refined by a pulverizer such as a wet grinding mill, whereby the inorganic-salt based coagulant is dispersed uniformly in the mixture of the edible oil or fat and the natural wax. The wet grinding mill used for refining the particles of the inorganic salt-based coagulant for tofu is not particularly limited, but examples thereof include Sand Mill (manufactured by Sintokogio, Ltd.), and Bead Mill (manufactured by Finetec Co., Ltd.).

The thus-obtained present composition can coagulate a protein by being added to heated soymilk, and therefore can be used in tofu production simply by replacing a conventional tofu coagulant. In addition, the tofu in which the present composition can be used is not particularly limited, and examples thereof include a firm tofu, a silken tofu, and a filling tofu. When the present composition is used for production of a tofu, the amount of addition may be appropriately set depending on the kind or the like of the intended tofu, and the present composition may be added in an amount of, for example, approximately from 0.1 to 0.6% by mass as the inorganic salt-based coagulant for tofu (in terms of the anhydrate form) so as to be the same amount as that of a conventional coagulant for soymilk.

When the present composition is added to heated soymilk, the inorganic salt-based coagulant for tofu contained in the present composition is gradually released, and therefore the coagulation starting point is delayed compared with conventional inorganic salt-based coagulants. Accordingly, the present composition can be suitably used in production of a silken tofu which has been heretofore difficult. Furthermore, the present composition can enhance the original flavor of tofu compared with a conventional water-in-oil type inorganic salt-based coagulant in which a large amount of an emulsifier is used (so-called emulsified bittern).

The thus-obtained tofu has the original flavor of tofu imparted. Incidentally, the tofu contains an inorganic salt-based coagulant for tofu, a natural wax, and an edible oil or fat. The natural waxes contained in the tofu have unsaponified materials as main components, and the lipid fraction in the tofu can be confirmed by gas chromatography using a nonpolar carrier column (for example, using a dimethylpolysiloxane as a carrier) as a simplified manner.

The tofu may be processed into, for example, a yakidofu (baked tofu), an aburaage (deep-fried tofu), a ganmodoki, or an atsuage (thick deep-fried tofu).

EXAMPLES

The present invention is described in detail below with reference to examples, but the invention is by no means limited to the examples.

Example 1

Preparation of Coagulant Composition for Tofu 1

To 387.2 g of cone oil, 12 g of bees wax (purified bees wax FY-100: manufactured by Yokoseki Oil & Fat Industries, Co., Ltd.) and 0.8 g of carnauba wax (purified carnauba wax R-100: manufactured by Yokoseki Oil & Fat Industries, Co., Ltd.) were added and the mixture was heated to 80° C. to completely dissolve the waxes. To the resulting mixture, under stirring at 4000 rpm with a T.K mixer (manufactured by Primix Corporation), 600 g of an inorganic salt-based coagulant for tofu obtained by dissolving 360 g of magnesium chloride (crystalline: manufactured by Ako Kasei Co., Ltd.) in water was added. The rotation rate of the mixer was then set to 10000 rpm to uniformly disperse the mixture for 3 minutes, whereby a coagulant composition for tofu 1 was obtained. The obtained coagulant composition for tofu 1 was stored at 20° C.

Example 2

Preparation of Coagulant Composition for Tofu 2

To 392 g of cone oil, 6 g of bees wax (the same as the above) and 2 g of rice bran wax (purified rice bran wax S-100: manufactured by Yokoseki Oil & Fat Industries, Co., Ltd.) were added and the mixture was heated to 80° C. to completely dissolve the waxes. To the resulting mixture, under stirring at 4000 rpm with a T.K mixer (the same as the above), 600 g of an inorganic salt-based coagulant for tofu obtained by dissolving 360 g of magnesium chloride (the same as the above) in water was added. The rotation rate of the mixer was then set to 10000 rpm to uniformly disperse the mixture for 3 minutes, whereby a coagulant composition for tofu 2 was obtained. The obtained coagulant composition for tofu 2 was stored at 20° C.

Comparative Example 1

Preparation of Comparative Coagulant Composition for Tofu 1

In 380 g of cone oil, 20 g of a polyglycerol condensed ricinoleic acid ester (Sunsoft 818SK: manufactured by Taiyo Kagaku Co., Ltd.) was dissolved. Under stirring at 4000 rpm with a T.K mixer (the same as the above), 600 g of an inorganic salt-based coagulant for tofu obtained by dissolving 360 g of magnesium chloride (the same as the above) in water was added to the mixture. The rotation rate of the mixer was then set to 10000 rpm to emulsify and disperse the mixture for 5 minutes, whereby a comparative coagulant composition for tofu was obtained. The obtained comparative coagulant composition for tofu was stored at 20° C.

Example 3

Production and Evaluation of Silken Tofu

The coagulant composition for tofu 1, the coagulant composition for tofu 2, and the comparative coagulant composition for tofu 1 which were produced in the Examples and Comparative Example and stored at 20° C. were used to produce silken tofus and conduct the evaluation tests.

Using a System Mag (model: TK-40, manufactured by Earth System 21), 36 g of the coagulant composition for tofu 1 in terms of magnesium chloride hexahydrate was dispersed in 12 L of soymilk obtained by an ordinary method (soybean: Fukuyutaka produced in Japan, Brix.12.5) at 80° C. to obtain a dispersed mixture. The dispersion of the soymilk and the coagulant composition for tofu was performed in the following setting: a mixing time of 19 seconds and a rotation rate of stirring of 5000 rpm. The dispersed mixture was poured into a molding box (350 mm×360 mm×150 mm) to fill the molding box with the dispersed mixture. The dispersed mixture was aged for 15 minutes and then cut into a fixed size, removed from the molding box, exposed to a tap water for 30 minutes, and then packed into a packaging container. A silken tofu was thus produced. The silken tofu was stored at 5° C. for 24 hours and used as a sample for evaluation.

The time from the filling the molding box with the dispersed mixture until starting of coagulation was measured, and the time (in seconds) was taken as a soymilk coagulation starting time. For the silken tofu, the inner phase of the tofu and the flavor were evaluated according to the following evaluation criteria. In addition, the hardness of the silken tofu was measured with a tofu hardness meter (rod type tension gauge (0 adjustment type): manufactured by Ohba Keiki Seisakusho). A silken tofu was produced and stored also with each of the coagulant composition for tofu 2 and the comparative coagulant composition for tofu 1, and the silken tofu was subjected to the same measurements and evaluations as in the above. The results are shown in Table 1.

<Evaluation Criteria of Inner Phase>
(Evaluation) (Detail)
A Uniform and glossy
B Not rough and rather glossy
C Rather rough and not glossy
D Rough and not glossy <Evaluation Criteria of Flavor>
(Evaluation) (Detail)
A Having strong umami (a good taste) and sweetness of soybean and having thick feeling
B Having umami and sweetness of soybean and having thick feeling
C Having no foreign taste but having no soybean flavor
D Having foreign taste

TABLE 1

| | Coagulant composition for tofu 1 | Coagulant composition for tofu 2 | Comparative coagulant composition for tofu 1 |
|---|---|---|---|
| Coagulation starting time (seconds) | 19 | 15 | 19 |

TABLE 1-continued

|  | Coagulant composition for tofu 1 | Coagulant composition for tofu 2 | Comparative coagulant composition for tofu 1 |
|---|---|---|---|
| Hardness (g) | 91 | 83 | 76 |
| Inner phase | A | B | B |
| Flavor | A | A | C |

As is apparent from table 1, it was found that the present composition has the same level of slow-acting property as a conventional tofu coagulant which is considered to have a slow-acting property, and the obtained tofu has a good inner phase and a rich flavor originated in soybean.

Example 4

Production and Evaluation of Firm Tofu

The coagulant composition for tofu 1, the coagulant composition for tofu 2, and the comparative coagulant composition for tofu 1 obtained in Examples and Comparative Example were used to produce firm tofus and conduct the evaluation tests.

Using a System Mag (the same as the above), 36 g of the coagulant composition for tofu 1 in terms of magnesium chloride hexahydrate was dispersed in 12 L of soymilk obtained by an ordinary method (soybean: Fukuyutaka produced in Japan, Brix.12.5) at 80° C. to obtain a dispersed mixture. The dispersion of the soymilk and the coagulant composition for tofu was performed in the following setting: a mixing time of 19 seconds and a rotation rate of stirring of 5000 rpm. The dispersed mixture was poured into a molding box (350 mm×360 mm×150 mm) to fill the molding box with the dispersed mixture and the dispersed mixture was aged for 15 minutes. The resultant was subjected to a step of slight break and an operation of water elimination by pressing in accordance with an ordinary method, and then cut into a fixed size, removed from the molding box, exposed to a tap water for 30 minutes, and then packed into a packaging container. A firm tofu was thus produced. The firm tofu was stored at 5° C. for 24 hours and then used as a sample for evaluation of firm tofu.

After the aging and the operation of water elimination, the weight was measured to calculate the yield of the firm tofu. In addition, as for the firm tofu, the flavor was evaluated according to the same criteria as in Example 3. Furthermore, a firm tofu was produced and stored also with each of the coagulant composition for tofu 2 and the comparative coagulant composition for tofu 1, and the firm tofu was subjected to the same measurements and evaluations as in the above. The results are shown in Table 2.

TABLE 2

|  | Coagulant composition for tofu 1 | Coagulant composition for tofu 2 | Comparative coagulant composition for tofu 1 |
|---|---|---|---|
| Yield (wt %) | 70 | 69 | 70 |
| Flavor | B | B | C |

As is apparent from Table 2, it was found that the present composition shows the same level of yield as a conventional tofu coagulant, and the obtained tofu has a rich flavor originated in soybean.

Example 5

Preparation of Coagulant Composition for Tofu 3

To 390.8 g of cone oil, 8 g of bees wax (the same as the above), 0.8 g of carnauba wax (the same as the above), and 0.4 g of rice bran wax (the same as the above) were added, and the mixture was heated to 80° C. to completely dissolve the waxes. The resulting mixture was cooled to 20° C. to obtain a mixture of natural waxes and cone oil in which a part of the natural waxes was precipitated as crystal. To the mixture of the natural waxes and cone oil, under stirring at 4000 rpm with a T.K mixer (the same as the above), 600 g of a solution of an inorganic salt-based coagulant for tofu obtained by dissolving 360 g of magnesium chloride (the same as the above) in water was added. The rotation rate of the mixer was then set to 10000 rpm to uniformly disperse the mixture for 3 minutes, whereby a coagulant composition for tofu 3 was obtained. The obtained coagulant composition for tofu 3 was stored at 20° C.

Test Example 1

Stability Test of Coagulant Composition for Tofu

The coagulant composition for tofu 1, the coagulant composition for tofu 2 and the coagulant composition for tofu 3 obtained in the Examples were stored at 20° C. a whole day and night after production, and then each placed in a sealed container and subjected to a storage test at a room temperature. The state (presence of oil float and water separation, and dispersion state) of the coagulant composition for tofu after stored for 3 months was checked. The results are shown in Table 3.

TABLE 3

|  | Coagulant composition for tofu 1 | Coagulant composition for tofu 2 | Coagulant composition for tofu 3 |
|---|---|---|---|
| Oil float | Slight oil float | Slight oil float | No oil float |
| Water separation | No | No | No |
| Dispersion state | Good | Good | Good |

In each of the coagulant composition for tofus 1 and 2, slight oil float was recognized on the surface of the composition after 3-month storage but the dispersion state was good, and the intended tofu of the present invention could be produced without any problem by lightly stirring in the tofu production. The coagulant composition for tofu 3 after 3-month storage was in the same state as that immediately after the production and there was no problem.

INDUSTRIAL APPLICABILITY

The present composition can be used for production of tofu.

What is claimed is:

1. A coagulant composition, comprising an inorganic salt-based tofu coagulant dispersed in a mixture of a natural wax and an edible oil or fat, wherein said composition comprises no emulsifier, and wherein part of the natural wax is precipitated in the edible oil or fat.

2. The coagulant composition according to claim 1, wherein the inorganic salt-based tofu coagulant comprises one or two or more inorganic salts selected from magnesium chloride, magnesium sulfate, and calcium chloride.

3. The coagulant composition according to claim 1, wherein the natural wax is one or two or more selected from the group consisting of carnauba wax, rice bran wax, and bees wax.

4. The coagulant composition according to claim 1, wherein the edible oil or fat is in a liquid form at a normal temperature.

5. The coagulant composition according to claim 1, wherein the composition comprises 0.5 to 10 parts by mass of the natural wax relative to 100 parts by mass of the edible oil or fat.

6. The coagulant composition according to claim 1, wherein the inorganic salt-based tofu coagulant is in a state of solution.

7. A method of producing tofu, comprising adding a coagulant composition comprising an inorganic salt-based tofu coagulant dispersed in a mixture of a natural wax and an edible oil or fat, said coagulant composition comprising no emulsifier, to heated soymilk, wherein said method no emulsifier is added to said heat soymilk.

8. The coagulant composition of claim 1, wherein the inorganic salt-based tofu coagulant is at least one hydrated inorganic salt, and wherein the composition comprises 20-70% by mass of said at least one hydrated inorganic salt, 10-60% by mass of the edible oil or fat and 0.5 to 10 parts by mass of the natural wax.

9. The coagulant composition according to claim 1, wherein the inorganic salt-based tofu coagulant comprises one or two or more inorganic salts selected from magnesium chloride, magnesium sulfate, and calcium chloride, wherein the natural wax is selected from carnauba wax, rice bran wax, and bees wax, and wherein the edible oil or fat is selected from soybean oil, rape seed oil, cotton seed oil, safflower oil, sunflower oil, rice bran oil, cone oil, coconut oil, palm oil, and olive oil.

10. A tofu comprising the inorganic salt-based tofu coagulant, natural wax, and edible oil or fat of the coagulant composition of claim 1, and no emulsifier.

11. A coagulant composition, comprising an inorganic salt-based tofu coagulant dispersed in a mixture of a natural wax and an edible oil or fat, wherein said composition comprises no emulsifier, wherein the inorganic salt-based tofu coagulant is at least one hydrated inorganic salt, and wherein the composition comprises 20-70% by mass of said at least one hydrated inorganic salt, 10-60% by mass of the edible oil or fat and 0.5 to 10 parts by mass of the natural wax.

12. The coagulant composition according to claim 11, wherein the natural wax is one or two or more selected from the group consisting of carnauba wax, rice bran wax, and bees wax.

13. The coagulant composition according to claim 11, wherein the edible oil or fat is in a liquid form at a normal temperature.

14. The coagulant composition according to claim 11, wherein the composition comprises 0.5 to 10 parts by mass of the natural wax relative to 100 parts by mass of the edible oil or fat.

15. A tofu comprising the inorganic salt-based tofu coagulant, natural wax, and edible oil or fat of the coagulant composition of claim 11, and no emulsifier.

16. A method of producing tofu, comprising adding the coagulant of claim 1 to heated soymilk, and wherein in said method no emulsifier is added to said heated soy milk.

17. A method of producing tofu, comprising adding the coagulant of claim 11 to heated soymilk, and wherein in said method no emulsifier is added to said heated soy milk.

* * * * *